(12) United States Patent
Chapman

(10) Patent No.: US 10,876,453 B1
(45) Date of Patent: Dec. 29, 2020

(54) VEHICLE HAVING AN ENGINE-INTEGRATED EXHAUST TREATMENT SYSTEM WITH IN-CYLINDER AMMONIA CREATION

(71) Applicant: Faurecia Emissions Control Technologies, USA, LLC, Columbus, IN (US)

(72) Inventor: Christopher S. Chapman, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/453,366

(22) Filed: Jun. 26, 2019

(51) Int. Cl.
*F01N 3/20* (2006.01)

(52) U.S. Cl.
CPC ........ *F01N 3/2066* (2013.01); *F01N 2610/02* (2013.01)

(58) Field of Classification Search
CPC ............................ F01N 3/2066; F01N 2610/02
See application file for complete search history.

(56) References Cited

U.S. PATENT DOCUMENTS

| | | |
|---|---|---|
| 5,718,194 A | 2/1998 | Binion |
| 2011/0264355 A1* | 10/2011 | Iwatani ................ F02M 69/046 701/103 |

FOREIGN PATENT DOCUMENTS

WO     1996008641 A1     3/1996

OTHER PUBLICATIONS

Valeri I. Golovitchev, Luca Montorsi & Ingemar Denbratt, Numerical Evaluation of a New Strategy of Emissions Reduction by Urea Direct Injection for Heavy Duty Diesel Engines, Engineering Applications of Computational Fluid Mechanics, Nov. 19, 2014, 19 pages.

* cited by examiner

*Primary Examiner* — Brandon D Lee
(74) *Attorney, Agent, or Firm* — Barnes & Thornburg LLP

(57) ABSTRACT

An over-the-road vehicle including an engine unit and an engine-integrated exhaust treatment system is disclosed. The engine-integrated exhaust treatment system can selectively reduce nitrous oxides (NOx) in exhaust gases from the engine unit. The engine-integrated exhaust treatment system includes a reagent doser integrated into the engine unit and a catalyst in fluid communication with the engine unit. The reagent doser injects aqueous urea solution into at least one cylinder of the engine unit without fuel while fuel is injected into at least one other cylinder of the engine unit for combustion. The aqueous urea solution is converted in the cylinder to ammonia gas that is mixed with exhaust gases from the other cylinders. This mixture is then exposed to the catalyst to encourage reduction of NOx in the exhaust gases before they are discharged to atmosphere.

15 Claims, 4 Drawing Sheets

Figure 1:
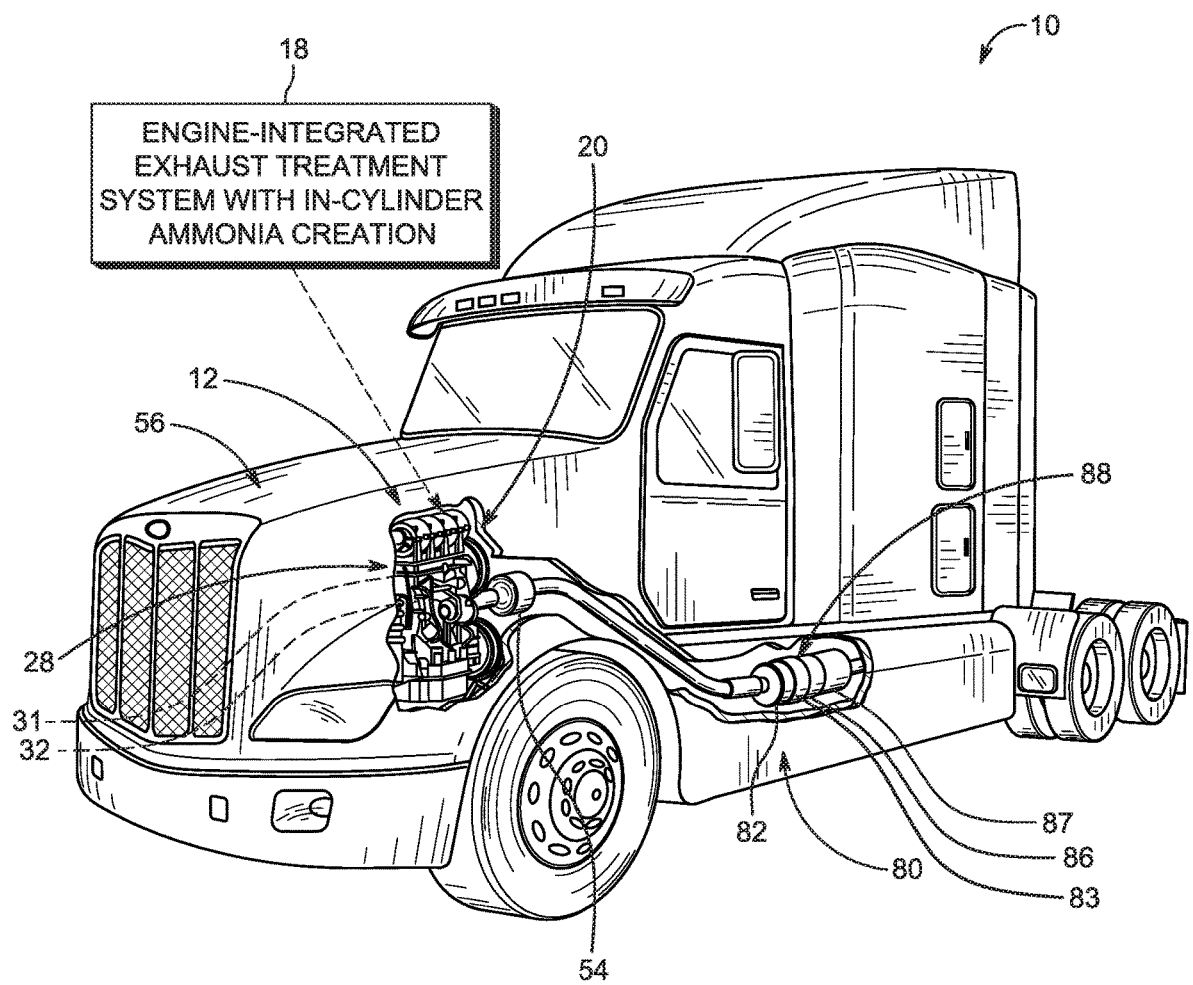

VEHICLE HAVING AN ENGINE-INTEGRATED EXHAUST TREATMENT SYSTEM WITH IN-CYLINDER AMMONIA CREATION

BACKGROUND

The present disclosure relates to exhaust treatment systems for automotive applications, and particularly to the incorporation of onboard ammonia gas creation to support reduction of undesired nitrous oxides (NOx) present within the exhaust gases.

SUMMARY

An over-the-road vehicle including an engine unit and a remote exhaust treatment system is disclosed. The engine unit burns fuel to drive wheels of the over-the-road vehicle creating exhaust gases with undesired nitrous oxides (NOx) and other contaminants. The remote exhaust treatment system is located downstream of the engine unit and reduces NOx in the exhaust gases.

In illustrative embodiments, the over-the-road vehicle also includes an engine-integrated exhaust treatment system that can selectively supplement NOx reduction provided by the remote exhaust treatment system. The engine-integrated exhaust treatment system includes a reagent doser integrated into the engine unit and a close-coupled catalyst in fluid communication with the engine ahead of the remote exhaust treatment system. The reagent doser injects aqueous urea solution into at least one cylinder of the engine unit without fuel while fuel is injected into at least one other cylinder of the engine unit for combustion. The aqueous urea solution is converted in the cylinder to ammonia gas that is mixed with exhaust gases from the other cylinders. This mixture is then exposed to the close-coupled catalyst to encourage reduction of NOx in the exhaust gases before they reach the remote exhaust treatment system.

In illustrative embodiments, the engine unit may include a turbocharger driven by exhaust gases leaving the cylinders that compresses atmospheric air moving into the cylinders. The ammonia gas from the engine-integrated exhaust treatment system and the exhaust gases from other cylinders in the engine unit may be mixed in the turbocharger before being exposed to the close-coupled catalyst.

In illustrative embodiments, a controller is used to direct operation of components in the over-the-road vehicle. The controller may form part of the engine-integrated exhaust treatment system and is configured to selectively stop injection of fuel into a cylinder and to selectively start injection of aqueous urea solution into the cylinder so as to start ammonia gas production. The controller may start ammonia gas production at times when supplemental NOx reduction can help to meet desired overall targets for NOx discharge. One such time can include during startup of the engine unit when the remote exhaust treatment system may be relatively cool, leading to lower than normal performance in NOx reduction.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
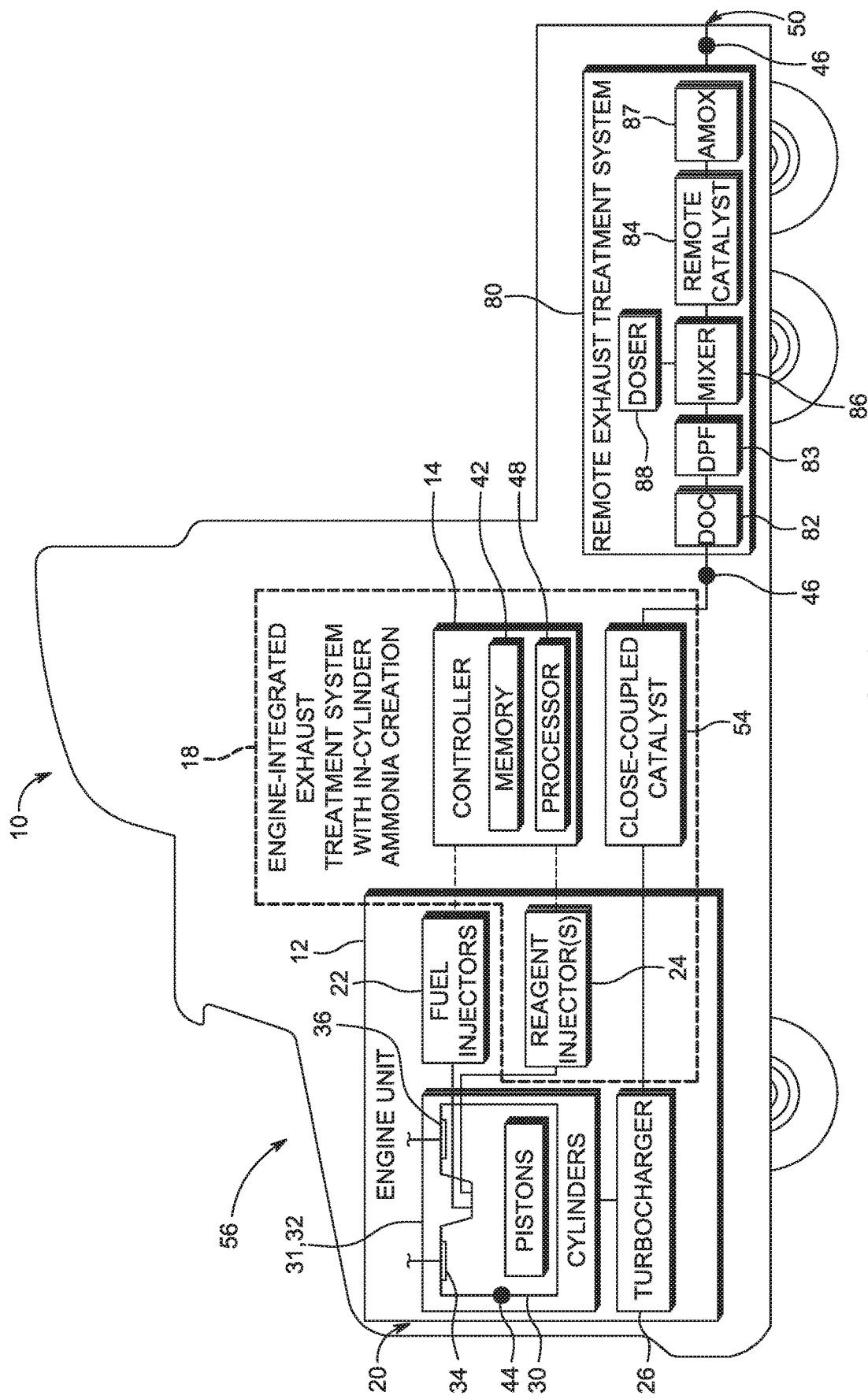
Figure 3:
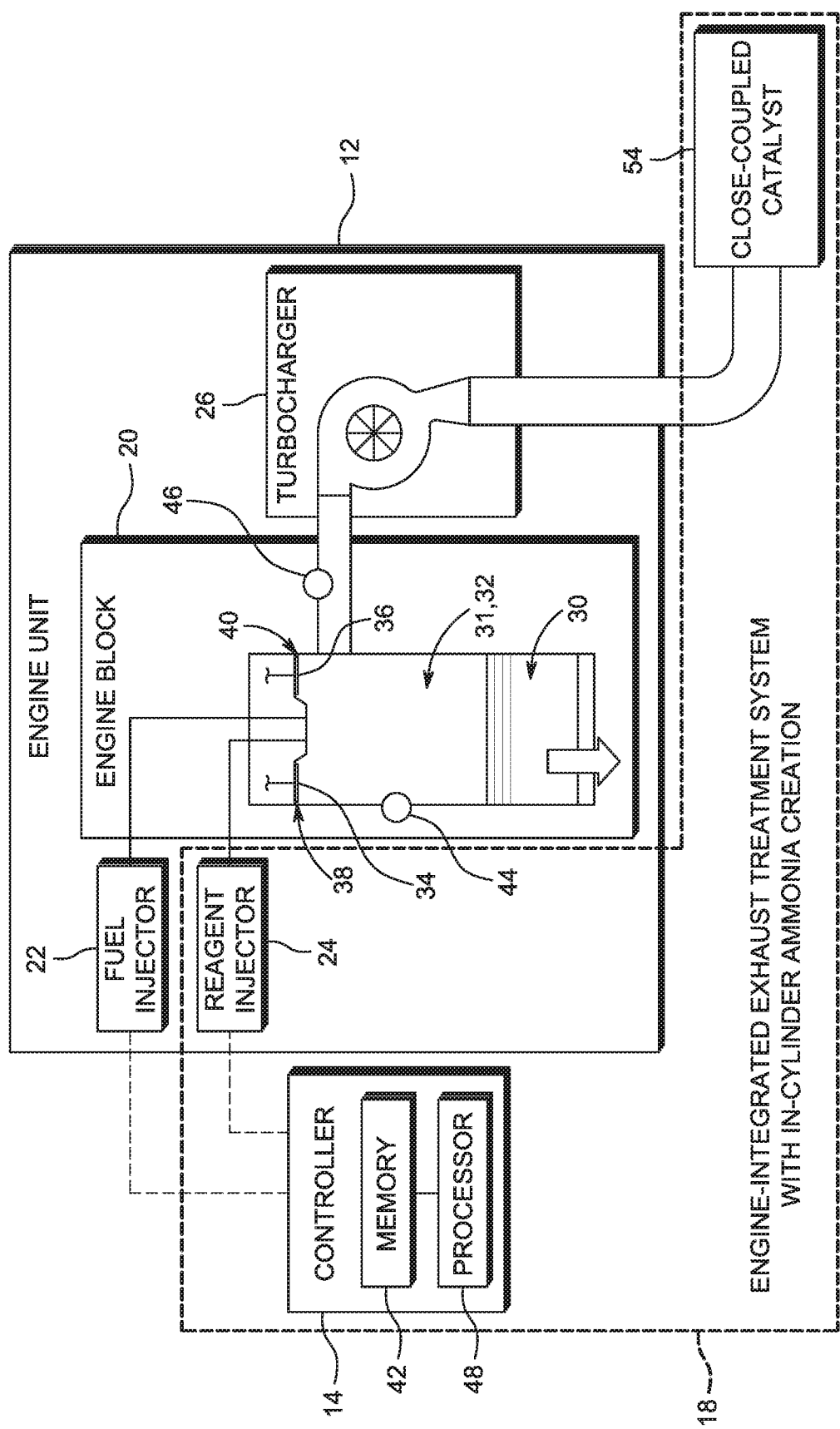
Figure 4:
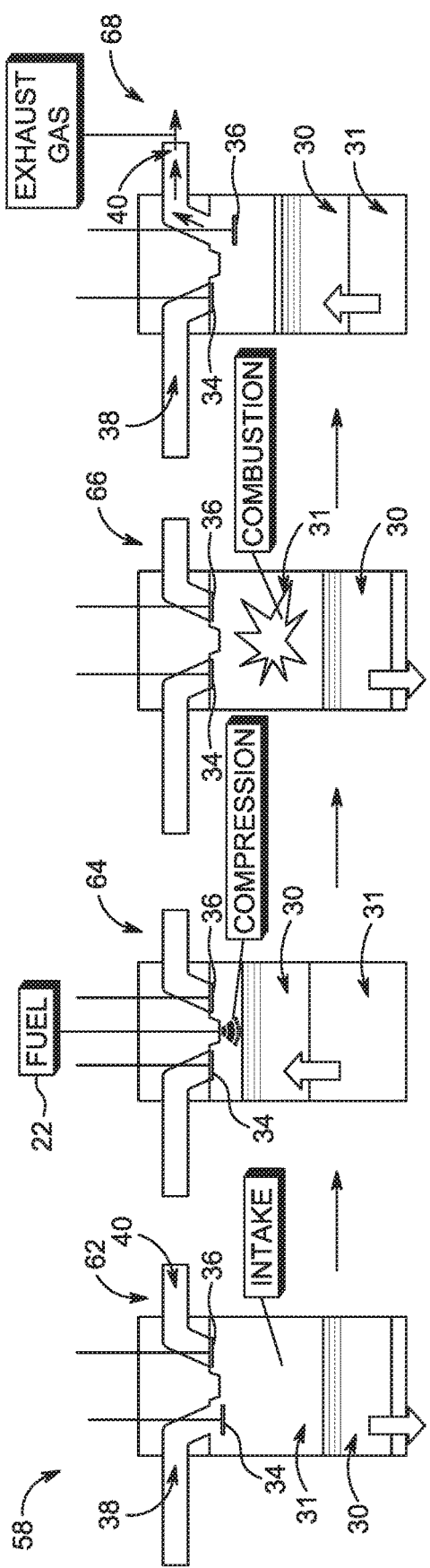
Figure 5:
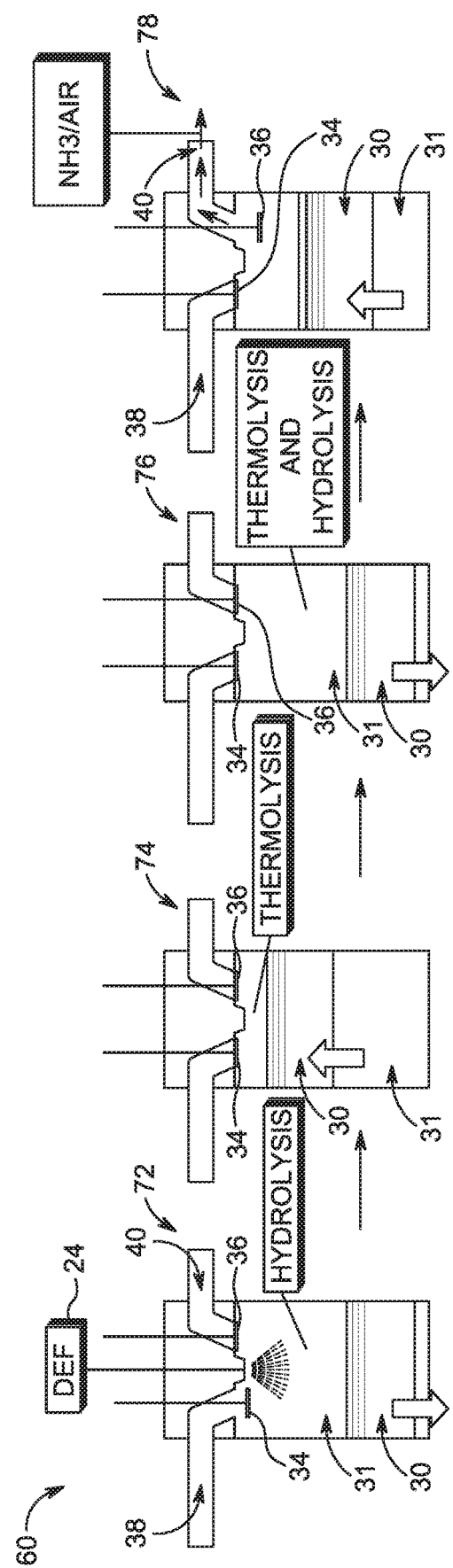

The detailed description particularly refers to the accompanying figures in which:

FIG. 1 is perspective view of an over-the-road vehicle with a diesel power train including an engine unit, an engine-integrated exhaust treatment system with in-cylinder ammonia creation that generates ammonia gas for mixing with exhaust gases to reduce NOx in the exhaust gases, and a remote exhaust treatment system located downstream of the engine unit for further reducing NOx in the exhaust gases;

FIG. 2 is a diagrammatic view of the diesel engine semi-truck of FIG. 1 showing that engine unit includes an engine block having cylinders and pistons mounted within the cylinders, fuel injectors for injecting fuel into the cylinders, and at least one reagent injector for injecting aqueous urea solution into an associated cylinder to generate ammonia gas within the associated cylinder during cyclical movement of a piston therein when no fuel is injected into the associated cylinder;

FIG. 3 is a detail diagrammatic view of the engine-integrated exhaust system included in the semi-truck of FIG. 1 showing that the engine-integrated exhaust system includes the reagent injector, a close-coupled catalyst that interacts with mixed exhaust gases and ammonia gas to encourage chemical reaction reducing NOx in the exhaust gases, and a controller coupled to the fuel injectors and the reagent injector to selectively switch between injecting fuel and aqueous urea solution into the cylinder associated with the reagent injector so that the cylinder is substantially free from injected fuel during creation of the ammonia gas;

FIG. 4 is a detail diagrammatic view of a combustion mode four-stroke engine cycle showing the combustion mode four-stroke engine cycle includes an intake stroke during which air is pulled into the corresponding cylinder of the plurality of cylinders, a compression stroke in which air in the corresponding cylinder of the plurality of cylinders is compressed and mixed with the fuel, a power stroke in which the fuel is combusted to create exhaust gases, and an exhaust stroke in which the exhaust gases are discharged from the corresponding cylinder of the plurality of cylinders; and FIG. 5 is a detail diagrammatic view of an ammonia-generation mode four-stroke engine cycle showing the ammonia-generation mode four-stroke engine cycle includes an intake stroke during which air is pulled into the corresponding cylinder of the plurality of cylinders and mixed with the aqueous urea solution, a compression stroke in which air and aqueous urea solution in the corresponding cylinder of the plurality of cylinders are compressed, a power stroke in which the aqueous urea solution is converted to ammonia gas, and an exhaust stroke in which the ammonia gas is discharged from the corresponding cylinder of the plurality of cylinders.

DETAILED DESCRIPTION

For the purposes of promoting an understanding of the principles of the disclosure, reference will now be made to a number of illustrative embodiments illustrated in the drawings and specific language will be used to describe the same.

An exemplary over-the-road vehicle 10 with a chassis supported by wheels is shown in FIG. 1. The over-the-road vehicle 10 includes an engine unit 12, a controller 14, a remote exhaust treatment system 80, and an engine-integrated exhaust treatment system 18 as shown in FIGS. 1 and 2. The engine unit 12 illustratively operates on diesel fuel and is configured for a four-stroke engine cycle. The controller 14 is configured for directing operation of the engine unit 12 and other components of the over-the-road vehicle 10. The remote exhaust treatment system 14 is located downstream of the engine unit 12 and is configured to reduce NOx along with other unwanted contaminants in the exhaust gases from the engine unit 12. The engine-integrated exhaust treatment system 18 is integrated into the engine unit 12 and can selectively supplement NOx reduction provided by the remote exhaust treatment system 14.

More specifically, the illustrated engine-integrated exhaust treatment system 18 is configured for in-cylinder ammonia gas creation as suggested in FIG. 5. The ammonia gas can be mixed and reacted with exhaust gases from the engine unit 12 to reduce NOx in the exhaust gases. In the illustrated embodiment, the same reagent used in the remote exhaust treatment system 14, aqueous urea solution, is injected into a cylinder 31 of the engine unit 12 without fuel to generate ammonia gas. This ammonia gas from the cylinder 31 is then discharged with exhaust gases from other cylinders 32 into a turbo charger 26 that mixes the gases. The mixed ammonia gas and exhaust gases are then exposed to a close-coupled catalyst 54 in fluid communication with the turbocharger 54 to encourage a chemical reaction that reduces the NOx in the exhaust gases. This supplemental NOx reduction can be selectively engaged as desired to manage the overall discharge of NOx in exhaust gases discharged from the over-the-road vehicle 10.

The engine unit 12 is illustratively an engine configured to produce mechanical work via combustion of fuel (diesel fuel, unleaded fuel, etc.) as suggested in FIGS. 1 and 2. The engine unit 12 includes an engine block 20, a plurality of fuel injectors 22, at least one reagent injector 24, and a turbocharger 26 as shown in FIGS. 2 and 3. The engine block 20 includes a plurality of cylinders 31, 32 and a plurality of pistons 30 mounted within cylinders 31, 32 for movement therein. The plurality of fuel injectors 22 are each configured to discharge fuel into a corresponding cylinder 31, 32 for combustion therein creating exhaust gases therein to drive motion of the pistons 30. The reagent injector 24 is configured to discharge an aqueous urea solution into one cylinder 31 to support creation of ammonia gas within the cylinder 31, 32. The turbocharger 26 is fluidly coupled to each of the cylinders 31, 32 to receive and mix exhaust gases from the cylinders 31, 32 and ammonia gas from the one cylinder 31. The turbocharger 26 is driven by the exhaust gases to then pressurize atmospheric air for use in combustion within the engine block 20.

In other embodiments, the engine unit 12 includes at two or more reagent injectors 24. Each of the reagent injectors 24 are configured to discharge the aqueous urea solution into a corresponding cylinder.

The engine block 20 further includes intake and outlet valves 34, 36 as shown in FIGS. 2 and 3. The engine unit 12 is configured for a diesel fuel four-stroke engine cycle but could be configured for an unleaded fuel four-stroke engine cycle as is known in the art. The intake and outlet valves 34, 36 are arranged at inlets 38 and outlets 40 of the cylinders 28 to open and close the inlets 38 and outlets 40 of the cylinders 28 during operation of the engine unit 12 through illustrative the four-stroke engine cycle. The intake valve 34 is configured to selectively open the inlet 38 of the corresponding cylinder 28 to receive air, while the outlet valve 36 is configured to selectively open the outlet 40 of the corresponding cylinder 28 to release exhaust gases.

The controller 14 includes a memory 42 and a processor 48 as shown in FIGS. 2 and 3. The memory 42 is configured to store instructions that are carried out by the processor 48. The processor 48 is configured to carry out the instructions from the memory 42. Sensors 44, 46 are coupled to the processor 48 and are configured to send signals indicative of temperature, NOx levels, and/or other measured indicators to the processor 48. The processor 48 may use signals from the sensors 44, 46 to implement instructions from memory 42.

The illustrated sensors 44, 46 include a temperature sensor 44 and a NOx sensor 46 as shown in FIGS. 2 and 3. The temperature sensor 44 is coupled to the cylinder 31 and is configured to measure the temperature of the cylinder 31. The NOx sensor 46 is coupled to an exhaust outlet 50 of the vehicle and configured to measure the nitrous oxide levels in the exhaust gases being discharged from the vehicle 10.

In some embodiments, a temperature sensor 44 may be coupled to each of the cylinders 31, 32. In other embodiments, each cylinder of the plurality of cylinders 31, 32 may have a temperature sensor 44 to measure the temperature of the cylinder 31, 32. In other embodiments, a temperature sensor 44 may be coupled to another component of the engine unit 12 to measure the overall temperature of the engine unit 12. In other embodiments, a temperature sensor 44 may be coupled to the remote exhaust treatment system 80 to measure the engine start up temperature of the remote exhaust treatment system 80.

In the illustrative embodiment, a NOx sensor 46 is also coupled to the outlet 40 of the cylinder 31. In other embodiments, a NOx sensor 46 may be coupled to each outlet 40 of each of the plurality of cylinders 28. In other embodiments, a NOx sensor 46 may be located at an outlet of the engine unit 12. In other embodiments, a NOx sensor 46 may be located at an outlet 55 of the engine-integrated exhaust treatment system 18.

The remote exhaust treatment system 80 includes a diesel oxidation catalyst 82 (DOC), a diesel particulate filter 83 (DPF), a remote catalyst 84, and other catalyst devices such as an ammonia oxidation catalyst 85 (AMOX) in addition to a reducing agent mixer 86. The DOC 82 and the 83 DPF are configured to treat the exhaust gas before it enters the reducing agent mixer 86. The reducing agent mixer 86 is configured to mix the exhaust gases with the reagent (i.e. aqueous urea solution) that is sprayed into the exhaust stream by a doser 88 fluidly coupled to the mixer 86. The remote catalyst 84 is configured to interact with mixed exhaust gases from mixer 86 to encourage chemical reaction between the reagent and the exhaust gases thereby reducing undesired nitrous oxides present within the exhaust gases. The AMOX 87 is configured to reduce the amount of ammonia slip from the remote catalyst 84. In some embodiments, the remote exhaust treatment system 80 may be downsized or omitted all together in view of the engine-integrated system 18 included in the vehicle 10.

The engine-integrated exhaust treatment system 18 uses thermal and mechanical energy within the engine unit 12 to create ammonia gas from aqueous urea solution that can be used to reduce NOx in exhaust gases. The engine-integrated system 18 can be selectively activated during times when the remote exhaust treatment system 80 may not be sufficient to reach desired NOx reduction of the engine unit 12.

The engine-integrated exhaust treatment system 18 is provided by the reagent injector 24, the controller 14, and a close-coupled catalyst 54 as shown in FIGS. 2 and 3. The close-coupled catalyst 54 is configured to interact with mixed exhaust gases from the cylinders 32 and ammonia gas from the one cylinder 31 to encourage chemical reaction between the ammonia gas and exhaust gases thereby reducing undesired NOx present within the exhaust gases. The controller 14 is coupled to the fuel injectors 22 and to the reagent injector 24 to selectively switch between injecting fuel and aqueous urea solution into the cylinder 31 associated with the reagent injector 24 so that the cylinder 31 is substantially free from injected fuel during creation of the ammonia gas.

The engine block 20 and the close-coupled catalyst 54 are both housed in an engine compartment 56 of the vehicle 10 as shown in FIG. 2. The remote exhaust treatment system 80 is located downstream of the close-coupled catalyst 54 outside of the engine compartment 56.

In other embodiments, the close-coupled catalyst 54 may be outside the compartment 56 but is still upstream of the remote exhaust treatment system 80. In still other embodiments, the close-coupled catalyst may be omitted and the remote catalyst 84 acts to encourage reaction of the ammonia gas and exhaust gases to reduce NOx.

The engine unit 12 may be operated in a combustion mode 58 and an ammonia-generation mode 60 as suggested in FIGS. 4 and 5. The combustion mode 58 is characterized generally by injecting fuel into each of the plurality of cylinders 28 to combust the gases and power the engine unit 12 as shown in FIG. 4. The ammonia-generation mode 60 is characterized generally by deactivating the fuel injection into the one cylinder 31 and injecting aqueous urea solution into one cylinder 31 so that ammonia gas may be generated as shown in FIG. 5. It should be noted that in the ammonia-generation mode 60, fuel is injected into the other cylinders 32 of the plurality of cylinders 28 to power the engine unit 12 and drive the pistons 30.

The controller 14 is configured to change operation of the engine unit 12 between the combustion mode four-stroke engine cycle 58 and the ammonia-generation mode four-stroke engine cycle 60 by switching between injecting fuel and aqueous urea solution into the cylinder 31. For instance, during the combustion mode four-stroke engine cycle 58 of the engine unit 12, the controller 14 is configured to inject fuel into the cylinder 31 as shown in FIG. 4. During the ammonia-generation mode four-stroke engine cycle 60 of the engine unit 12, the controller 14 is configured to inject aqueous urea solution in to the cylinder 31 while withholding injecting fuel into the cylinder 31 as shown in FIG. 5.

In some embodiments including more than one reagent injector, the controller 14 may be configured to switch which cylinder 31, 32 will be injected with fuel or aqueous urea solution. In some embodiments, the controller 14 may be configured to alternate between injecting aqueous urea solution into the first cylinder 31 and the second cylinder 32 based on temperatures associated with each cylinder 31, 32.

The four-stroke engine cycle is characterized by motion of each piston 30 through an intake stroke 62, 72, a compression stoke 64, 74, a power stroke 66, 76, and an exhaust stroke 68, 78 as suggested in FIGS. 4 and 5. In the combustion mode four-stroke engine cycle 58, fuel is injected into the cylinders 31, 32 for combustion to drive the piston 30 and provide power to the vehicle 10. In the ammonia-generation mode four-stroke engine cycle 60, only aqueous urea solution is injected into the cylinder 31 for creating ammonia gas to be used in reducing the amounts of NOx in the exhaust gases, while fuel is injected into the other cylinder(s) 32 to continue a typical operation of the engine unit 12.

During the intake stroke 62 of the combustion mode 58, the intake valve 34 is opened and air is pulled into the corresponding cylinder 31 by the motion of the piston 30. During the compression stroke 64 of the combustion mode 58, the intake valve 34 is closed and the air in the corresponding cylinder 31, 32 is compressed by the piston 30. As the air is compressed, the controller 14 directs the fuel injector 22 to discharge fuel into the cylinder 31, 32 to mix with the air. During the power stroke 66 of the combustion mode 58, the valves 34, 36 remain closed and combustion of the fuel creates exhaust gases that drive the motion of the piston 30. During the exhaust stroke 68 of the combustion mode 58, the outlet valve 36 is opened and the exhaust gases are discharged from the corresponding cylinder 31, 32 by the motion of the piston 30.

During the intake stroke 72 of the ammonia-generation mode 60, the intake valve 34 is opened and air is pulled into the corresponding cylinder 31 by the motion of the piston 30. Simultaneously, the controller 14 directs the reagent injector 24 to discharge aqueous urea solution in the cylinder 31 to mix with the air. During the compression stroke 74 of the ammonia-generation mode 60, the intake valve 34 is closed so that the air and aqueous urea solution in the corresponding cylinder 31 are compressed. The compression of the air creates heat and begins the reaction of the aqueous urea solution to generate ammonia gas. During the power stroke 76 of the ammonia-generation mode 60, the valves 34, 36 remain closed and the air and aqueous urea solution are expanded by the motion of the piston 30 to convert the aqueous urea solution into to ammonia gas. During the exhaust stroke 78 of the ammonia-generation mode 60, the outlet valve 36 is opened and the ammonia gas is discharged from the corresponding cylinder.

The controller 14 may be configured direct the engine block 20 to switch between the combustion mode 58 and the ammonia-generation mode 60 based on several factors. For instance, the controller 14 is configured to selectively direct the reagent injector 24 to discharge the aqueous urea solution into the cylinder 31 during the intake stroke 72 and to withhold discharge of the fuel into the cylinder 31 during the compression stroke 64 in response to start up of the engine unit 12. At start up, the remote exhaust treatment system 80 may not yet be as hot as desired to begin reacting the aqueous urea solution and exhaust gases to reduce the nitrous oxide emissions in the exhaust gas. Therefore, at engine start up, the controller 14 may be configured to direct the engine unit 12 to operate in the ammonia-generation mode 60.

At engine start up, the controller 14 may be configured to direct the reagent injector 24 to discharge the aqueous urea solution in the cylinder 31 since the remote engine exhaust treatment system 80 may not be as hot as desired to react the aqueous urea solution into ammonia gas. In some embodiments, the controller 14 may also be configured to direct both the first reagent injector 24 and the second reagent injector 25 to discharge the aqueous urea solution in the first and second cylinders 31, 32 to generate even more ammonia gas as needed.

The controller 14 may also be configured to selectively switch between injecting fuel and aqueous urea solution into the cylinder 31 based upon the nitrous oxide levels within the exhaust gases measured by the sensors 46. The controller 14 may be configured to selectively direct the reagent injector 24 to discharge the aqueous urea solution into the cylinder 31 during the intake stroke 72 and to withhold discharge of the fuel into the cylinder 31 during the compression stroke 64 in response to receipt of a sensor signal indicative of nitrous oxide levels in the exhaust gases from the vehicle 10 at levels greater than a predetermined threshold.

The controller 14 may also be configured to selectively direct the reagent injector 24 to discharge the aqueous urea solution into the cylinder 31 during the intake stroke 72 and to withhold discharge of the fuel into the cylinder 31 during the compression stroke 64 in response to receipt of a sensor signal indicative of nitrous oxide levels in the exhaust gases being discharged from the cylinder 31 at levels greater than a predetermined threshold.

In some embodiments, the controller 14 may be configured to selectively direct multiple reagent injectors 24 to discharge the aqueous urea solution into the cylinders 31, 32 during the intake stroke 72. For example, multiple reagent injectors 24 may be activated in response to receipt of a sensor signal indicative of nitrous oxide levels in the exhaust gases being discharged from the vehicle 10 at levels greater than a predetermined threshold.

The controller 14 may be configured selectively switch between injecting fuel and aqueous urea solution into the cylinder 31 based upon temperature of the cylinder measured by the sensors 44. The controller 14 may be configured to selectively direct the reagent injector 24 to discharge the aqueous urea solution into the cylinder 31 during the intake stroke 72 and to withhold discharge of the fuel into the cylinder 31 during the compression stroke 64 based at least in part on receipt of a sensor signal indicative of temperature within the cylinder 31 being greater than a predetermined temperature.

The controller 14 may be configured to selectively switch between combustion mode 58 and the ammonia-generation mode 60 based on the engine unit 12 output load. The controller 14 may selectively direct the reagent injector 24 to discharge the aqueous urea solution into the cylinder 31 during the intake stroke 72 and to withhold discharge of the fuel into the cylinder 31 during the compression stroke 64 based at least in part on receipt that the engine unit 12 output load is below a predetermined threshold. Conversely, the controller 14 may selectively direct fuel injection and withhold aqueous urea solution based at least in part on receipt that the engine unit 12 output load is above a predetermined threshold.

Exhaust gases flow from engine unit 12 of vehicle 10 to the remote exhaust treatment system 80 after the four-stroke engine cycle. The exhaust gases flow through the DOC 82 and the DPF 83, and then through the reducing agent mixer 86 where the doser 88 injects reagent (sometimes called Diesel Emissions Fluid, DEF, AdBlue, and/or aqueous urea solution) into the mixer 86 to be added to the exhaust gases and mixed with the reagent. The exhaust gases then flow through a remote catalyst 84 and the AMOX 87 for reduction of nitrous oxides, hydrocarbons, and other impurities through chemical reactions. The exhaust gases are then released into atmosphere substantially free of NOx emissions.

A method of operating the vehicle 10 with the engine unit 12 and engine-integrated exhaust treatment system 18 is also provided in this disclosure. The method includes performing the combustion mode four-stroke engine cycle 58 in one step and performing the ammonia-generation mode four-stroke engine cycle 60 in another step.

The combustion mode four-stroke engine cycle 58 step includes, in order (i) opening the intake valve 34 and moving the piston 30 to pull air into the cylinder 31, 32 through the intake valve 34, (ii) closing the intake valve 34 and moving the piston 30 to compress air in the cylinder 31, 32, (iii) injecting fuel into the cylinder 31, 32, combusting the fuel to create hot exhaust gases, and moving the piston 30 to drive an associated power take off shaft, and (iv) opening the outlet valve 36 and moving the piston 30 to push the exhaust gases out of the cylinder 31, 32.

The ammonia-generation mode four-stroke engine cycle step includes, in order (i) opening the intake valve 34 and moving the piston 30 to pull air into the cylinder 31 through the intake valve 34, (ii) injecting aqueous urea solution into the cylinder 31 in the absence of substantially any injected fuel, (iii) closing the intake valve 34 and moving the piston 30 to compress air and aqueous urea solution in the cylinder 31, (iv) moving the piston 30 to create ammonia gas within the cylinder 31, and (v) opening the outlet valve 36 and moving the piston 30 to push the ammonia gas out of the cylinder 31.

The method can further include mixing the ammonia gas pushed out of the cylinder 31 with exhaust gases outside the cylinder 31 from the other cylinders 32. In the illustrative embodiment, the mixing of the ammonia gas pushed out of the cylinder 31 with exhaust gases is performed within the turbocharger 26. In other embodiments, other mixing devices may be used. The turbocharger may be omitted.

The method can also include exposing mixed ammonia gas and exhaust gases to a catalyst 54, 84. The catalyst 54, 84 is configured to encourage chemical reaction between the mixed ammonia gas and exhaust gases to thereby reduce undesired NOx present within the exhaust gases.

The present disclosure relates to a system and method for reducing ultra-low nitrous oxide emissions of the over-the-road vehicle 10. Some after treatment systems inject aqueous urea solution or diesel emission fluid (DEF) which can be problematic to an after-treatment system at low duty cycles or at cold start condition. The system and method of the present disclosure can generate ammonia gas for close-coupled treatment of the exhaust gases.

In the illustrative embodiments, urea water solution is injected into an engine cylinder 31 while the cylinder 31 fueling is turned off or deactivated. The hot cylinder 31 of the engine block 20 along with the expansion and compression strokes (intake stroke 72 and compression stroke 74) of the engine block 20 preforms hydrolysis and thermolysis to create ammonia gas. The turbocharger 26 mixes the ammonia gas with the exhaust gas from the other cylinders 28 and prepares the mixture for the close-coupled catalyst 54.

Additionally, the reagent or aqueous urea solution remaining in the cylinder 31 that had not been converted to ammonia gas also reacts with the exhaust gases to reduce NOx. The urea solution may be reacted in the catalyst 54 or later in the remote exhaust treatment system 80.

The engine-integrated exhaust treatment system with in-cylinder ammonia creation enables close coupling of the catalyst 54. Additionally, ammonia gas for close-coupled treatment is available without a separate after treatment systems. Urea deposits are also not likely to from due to the hot environment of the cylinder 31 for ammonia generation.

The ammonia gas is created using the four-stroke engine cycle of a typical engine block. However, instead of injecting fuel into the cylinder the controller 14 is configured to inject aqueous urea solution. The controller 14 mya be configured to alternate between the combustion mode four-stroke engine cycle and the ammonia-generation four-stroke engine cycle so that the cylinder 31 remains hot and the work output of the engine is not greatly effected.

During the first step, or the intake stroke 72, aqueous urea solution is injected into the hot cylinder 31 with fuel injection deactivated. The engine volume increases to expand the gas and evaporate the water (hydrolysis). During the second step, or the compression stroke 74, the air and aqueous urea solution mixture is compressed, creating heat and performing thermolysis. During the third step, or the power stroke 76, the hot gases expand again to promote further hydrolysis and thermolysis. The walls of the cylinder 31 are too hot to create liquid film deposits. During the fourth step, or the exhaust stroke 78, the ammonia gas and air is exhausted into the turbocharger 26 where the ammonia gas is mixed with the additional exhaust gases from the other engine cylinders 28. The ammonia gas and the exhaust are mixed homogenously and distributed to the close-coupled catalyst 54. The steps are repeated again with either fuel or aqueous urea solution, depending upon engine strategy, warm up procedure, engine load, or etc.

While the present disclosure illustrates implementation of the described engine-integrated exhaust treatment system 18 with an engine unit 12 in an over-the-road vehicle, other implementations are not outside the scope of the disclosure. For example, implementation of the described engine-integrated exhaust treatment system 18 with an engine unit 12 in a power generator, a locomotive (train), or a water-going vessel is explicitly contemplated. Moreover, implementation of the described engine-integrated exhaust treatment system 18 into any system with an engine unit 12 adapted for combustion of fuel is contemplated and enabled by the present disclosure.

The following numbered clauses include embodiments that are contemplated and non-limiting:

Clause 1: An over-the-road vehicle, the vehicle comprising an engine block including a plurality of cylinders and a plurality of pistons each mounted in a corresponding cylinder of the plurality of cylinders, a plurality of fuel injectors each configured to discharge fuel into a corresponding cylinder of the plurality of cylinders for combustion therein creating exhaust gases therein to drive motion of the plurality of pistons, and an engine-integrated exhaust treatment system including a first reagent injector configured to discharge an aqueous urea solution into a first cylinder of the plurality of cylinders to support creation of ammonia gas within the first cylinder, a close-coupled catalyst configured to interact with mixed exhaust gases from the plurality of cylinders and ammonia gas from the first cylinder to encourage chemical reaction between the ammonia gas and exhaust gases thereby reducing undesired nitrous oxides present within the exhaust gases, and a controller coupled to the plurality of fuel injectors and to the first reagent injector, wherein the controller is configured to selectively direct the first reagent injector to discharge the aqueous urea solution into the first cylinder and to direct a first fuel injector corresponding to the first cylinder to withhold fuel during discharge of the aqueous urea solution so that the first cylinder is substantially free from injected fuel during creation of the ammonia gas within the first cylinder so as to avoid the creation of nitrous oxides produced by combustion of the aqueous urea solution in the first cylinder.

Clause 2: The system of any other suitable clause or combination of clauses, wherein the vehicle further comprises a turbocharger fluidly coupled to the plurality of cylinders included in the engine block to receive and mix exhaust gases from the plurality of cylinders and ammonia gas from the first cylinder before the exhaust gases and the ammonia gas interact with the close-coupled catalyst.

Clause 3: The system of any other suitable clause or combination of clauses, further comprising a remote exhaust treatment system configured to receive exhaust gases after interaction with the close-coupled catalyst, the remote exhaust treatment system including a mixer defining a passageway along which exhaust gases move after interaction with the close-coupled catalyst, a doser configured to discharge aqueous urea solution into the passageway, and a remote catalyst configured to interact with mixed exhaust gases after interaction with the close-coupled catalyst and aqueous urea solution from the doser to encourage chemical reaction between the exhaust gases and the aqueous urea solution thereby reducing undesired nitrous oxides present within the exhaust gases before discharge of the exhaust gases out of the vehicle.

Clause 4: The system of any other suitable clause or combination of clauses, wherein the engine block and the close-coupled catalyst are both housed in an engine compartment of the vehicle, and wherein the remote exhaust treatment system is located outside the engine compartment.

Clause 5: The system of any other suitable clause or combination of clauses, wherein the engine block, the fuel injectors, and the first reagent injector cooperate with intake and outlet valves to provide an engine unit configured for an ammonia-generation mode four-stroke engine cycle characterized by motion of each of the plurality of pistons through an intake stroke during which air is pulled into the corresponding cylinder of the plurality of cylinders, a compression stroke in which air in the corresponding cylinder of the plurality of cylinders is compressed and mixed with either the fuel or the aqueous urea solution, a power stroke in which either the fuel is combusted to create exhaust gases or the aqueous urea solution is converted to ammonia gas, and an exhaust stroke in which either the exhaust gases or the ammonia gas is discharged from the corresponding cylinder of the plurality of cylinders.

Clause 6: The system of any other suitable clause or combination of clauses, further comprising a diesel fuel reservoir containing diesel fuel that is fluidly coupled to the plurality of fuel injectors.

Clause 7: The system of any other suitable clause or combination of clauses, wherein the controller is configured to selectively direct the first reagent injector to discharge the aqueous urea solution into the first cylinder during the intake stroke and to withhold discharge of the fuel into the first cylinder during the compression stroke in response to start up of the engine unit.

Clause 8: The system of any other suitable clause or combination of clauses, wherein the controller is configured to selectively direct the first reagent injector to discharge the aqueous urea solution into the first cylinder during the intake stroke and to withhold discharge of the fuel into the first cylinder during the compression stroke in response to receipt of a sensor signal indicative of nitrous oxide levels in the exhaust gases being discharged from the vehicle at levels greater than a predetermined threshold.

Clause 9: The system of any other suitable clause or combination of clauses, wherein the controller is configured to selectively direct the first reagent injector to discharge the aqueous urea solution into the first cylinder during the intake stroke and to withhold discharge of the fuel into the first cylinder during the intake stroke based at least in part on receipt of a first sensor signal indicative of nitrous oxide levels in the exhaust gases being discharged from the vehicle and second sensor signal indicative of temperature within the first cylinder.

Clause 10: The system of any other suitable clause or combination of clauses, wherein the engine-integrated exhaust treatment system includes a second reagent injector configured to discharge an aqueous urea solution into a second cylinder of the plurality of cylinders to support creation of ammonia gas within the second cylinder while a second fuel injector corresponding to the second cylinder withholds fuel.

Clause 11: The system of any other suitable clause or combination of clauses, wherein the controller is configured to selectively direct the first reagent injector or the second reagent injector to discharge the aqueous urea solution based at least in part on receipt of sensor signals indicative of temperatures within the first cylinder and the second cylinder.

Clause 12: A method of operating a vehicle with an engine unit including a cylinder, an intake valve configured to selectively open the cylinder to receive air, an outlet valve configured to selectively open the cylinder to release exhaust gases, a piston mounted in the cylinder for motion within the cylinder, a fuel injector configured to discharge fuel into the cylinder, and a reagent injector configured to discharge aqueous urea solution into the cylinder, the method comprising performing a combustion mode four-stroke engine cycle including, in order (i) opening the intake valve and moving the piston to pull air into the cylinder through the intake valve, (ii) closing the intake valve and moving the piston to compress air in the cylinder, (iii) injecting fuel into the cylinder, combusting the fuel to create hot exhaust gases, and moving the piston to drive an associated power take off shaft, and (iv) opening the outlet valve and moving the piston to push the exhaust gases out of the cylinder; and performing an ammonia-generation mode four-stroke engine cycle, in order (i) opening the intake valve and moving the piston to pull air into the cylinder through the intake valve, (ii) injecting aqueous urea solution into the cylinder in the absence of substantially any injected fuel, (iii) closing the intake valve and moving the piston to compress air and aqueous urea solution in the cylinder, (iv) moving the piston to create ammonia gas within the cylinder, and (v) opening the outlet valve and moving the piston to push the ammonia gas out of the cylinder.

Clause 13: The system of any other suitable clause or combination of clauses, further comprising mixing the ammonia gas pushed out of the cylinder with exhaust gases outside the cylinder.

Clause 14: The system of any other suitable clause or combination of clauses, wherein the mixing of the ammonia gas pushed out of the cylinder with exhaust gases is performed within a turbocharger.

Clause 15: The system of any other suitable clause or combination of clauses, further comprising exposing the mixed ammonia gas and exhaust gases to a catalyst configured to encourage chemical reaction between the mixed ammonia gas and exhaust gases to thereby reduce undesired nitrous oxides present within the exhaust gases.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An over-the-road vehicle, the vehicle comprising
an engine block including a plurality of cylinders and a plurality of pistons each mounted in a corresponding cylinder of the plurality of cylinders,
a plurality of fuel injectors each configured to discharge fuel into a corresponding cylinder of the plurality of cylinders for combustion therein creating exhaust gases therein to drive motion of the plurality of pistons, and
an engine-integrated exhaust treatment system including a first reagent injector configured to discharge an aqueous urea solution into a first cylinder of the plurality of cylinders to support creation of ammonia gas within the first cylinder, a close-coupled catalyst configured to interact with mixed exhaust gases from the plurality of cylinders and ammonia gas from the first cylinder to encourage chemical reaction between the ammonia gas and the exhaust gases thereby reducing undesired nitrous oxides present within the exhaust gases, and a controller coupled to the plurality of fuel injectors and to the first reagent injector,
wherein the controller is configured to selectively direct the first reagent injector to discharge the aqueous urea solution into the first cylinder and to direct a first fuel injector corresponding to the first cylinder to withhold fuel during discharge of the aqueous urea solution so that the first cylinder is substantially free from injected fuel during creation of the ammonia gas within the first cylinder so as to avoid the creation of nitrous oxides produced by combustion of the aqueous urea solution in the first cylinder.

2. The vehicle of claim 1, wherein the vehicle further comprises a turbocharger fluidly coupled to the plurality of cylinders included in the engine block to receive and mix exhaust gases from the plurality of cylinders and ammonia gas from the first cylinder before the exhaust gases and the ammonia gas interact with the close-coupled catalyst.

3. The vehicle of claim 1, further comprising a remote exhaust treatment system configured to receive exhaust gases after interaction with the close-coupled catalyst, the remote exhaust treatment system including a mixer defining a passageway along which exhaust gases move after interaction with the close-coupled catalyst, a doser configured to discharge aqueous urea solution into the passageway, and a remote catalyst configured to interact with mixed exhaust gases after interaction with the close-coupled catalyst and aqueous urea solution from the doser to encourage chemical reaction between the exhaust gases and the aqueous urea solution thereby reducing undesired nitrous oxides present within the exhaust gases before discharge of the exhaust gases out of the vehicle.

4. The vehicle of claim 3, wherein the engine block and the close-coupled catalyst are both housed in an engine compartment of the vehicle, and wherein the remote exhaust treatment system is located outside the engine compartment.

5. The vehicle of claim 1, wherein the engine block, the fuel injectors, and the first reagent injector cooperate with intake and outlet valves to provide an engine unit configured for an ammonia-generation mode four-stroke engine cycle characterized by motion of each of the plurality of pistons through an intake stroke during which air is pulled into the corresponding cylinder of the plurality of cylinders, a compression stroke in which air in the corresponding cylinder of the plurality of cylinders is compressed and mixed with either the fuel or the aqueous urea solution, a power stroke in which either the fuel is combusted to create exhaust gases or the aqueous urea solution is converted to ammonia gas, and an exhaust stroke in which either the exhaust gases or the ammonia gas is discharged from the corresponding cylinder of the plurality of cylinders.

6. The vehicle of claim 5, further comprising a diesel fuel reservoir containing diesel fuel that is fluidly coupled to the plurality of fuel injectors.

7. The vehicle of claim 5, wherein the controller is configured to selectively direct the first reagent injector to discharge the aqueous urea solution into the first cylinder during the intake stroke and to withhold discharge of the fuel into the first cylinder during the compression stroke in response to start up of the engine unit.

8. The vehicle of claim 5, wherein the controller is configured to selectively direct the first reagent injector to discharge the aqueous urea solution into the first cylinder during the intake stroke and to withhold discharge of the fuel into the first cylinder during the compression stroke in response to receipt of a sensor signal indicative of nitrous oxide levels in the exhaust gases being discharged from the vehicle at levels greater than a predetermined threshold.

9. The vehicle of claim 5, wherein the controller is configured to selectively direct the first reagent injector to discharge the aqueous urea solution into the first cylinder during the intake stroke and to withhold discharge of the fuel into the first cylinder during the intake stroke based at least in part on receipt of a first sensor signal indicative of nitrous oxide levels in the exhaust gases being discharged from the vehicle and second sensor signal indicative of temperature within the first cylinder.

10. The vehicle of claim 5, wherein the engine-integrated exhaust treatment system includes a second reagent injector configured to discharge an aqueous urea solution into a second cylinder of the plurality of cylinders to support creation of ammonia gas within the second cylinder while a second fuel injector corresponding to the second cylinder withholds fuel.

11. The vehicle of claim 10, wherein the controller is configured to selectively direct the first reagent injector or the second reagent injector to discharge the aqueous urea solution based at least in part on receipt of sensor signals indicative of temperatures within the first cylinder and the second cylinder.

12. A method of operating a vehicle with an engine unit including a cylinder, an intake valve configured to selectively open the cylinder to receive air, an outlet valve configured to selectively open the cylinder to release exhaust gases, a piston mounted in the cylinder for motion within the cylinder, a fuel injector configured to discharge fuel into the cylinder, and a reagent injector configured to discharge aqueous urea solution into the cylinder, the method comprising performing a combustion mode four-stroke engine cycle including, in order (i) opening the intake valve and moving the piston to pull air into the cylinder through the intake valve, (ii) closing the intake valve and moving the piston to compress air in the cylinder, (iii) injecting fuel into the cylinder, combusting the fuel to create hot exhaust gases, and moving the piston to drive an associated power take off shaft, and (iv) opening the outlet valve and moving the piston to push the exhaust gases out of the cylinder; and performing an ammonia-generation mode four-stroke engine cycle, in order (i) opening the intake valve and moving the piston to pull air into the cylinder through the intake valve, (ii) injecting aqueous urea solution into the cylinder in the absence of substantially any injected fuel, (iii) closing the intake valve and moving the piston to compress air and aqueous urea solution in the cylinder, (iv) moving the piston to create ammonia gas within the cylinder, and (v) opening the outlet valve and moving the piston to push the ammonia gas out of the cylinder.

13. The method of claim 12, further comprising mixing the ammonia gas pushed out of the cylinder with exhaust gases outside the cylinder.

14. The method of claim 13, wherein the mixing of the ammonia gas pushed out of the cylinder with exhaust gases is performed within a turbocharger.

15. The method of claim 13, further comprising exposing the mixed ammonia gas and exhaust gases to a catalyst configured to encourage chemical reaction between the mixed ammonia gas and exhaust gases to thereby reduce undesired nitrous oxides present within the exhaust gases.

* * * * *